H. A. ORME.
ELECTRIC SOLDERING IRON.
APPLICATION FILED NOV. 20, 1916.
1,215,693.
Patented Feb. 13, 1917.
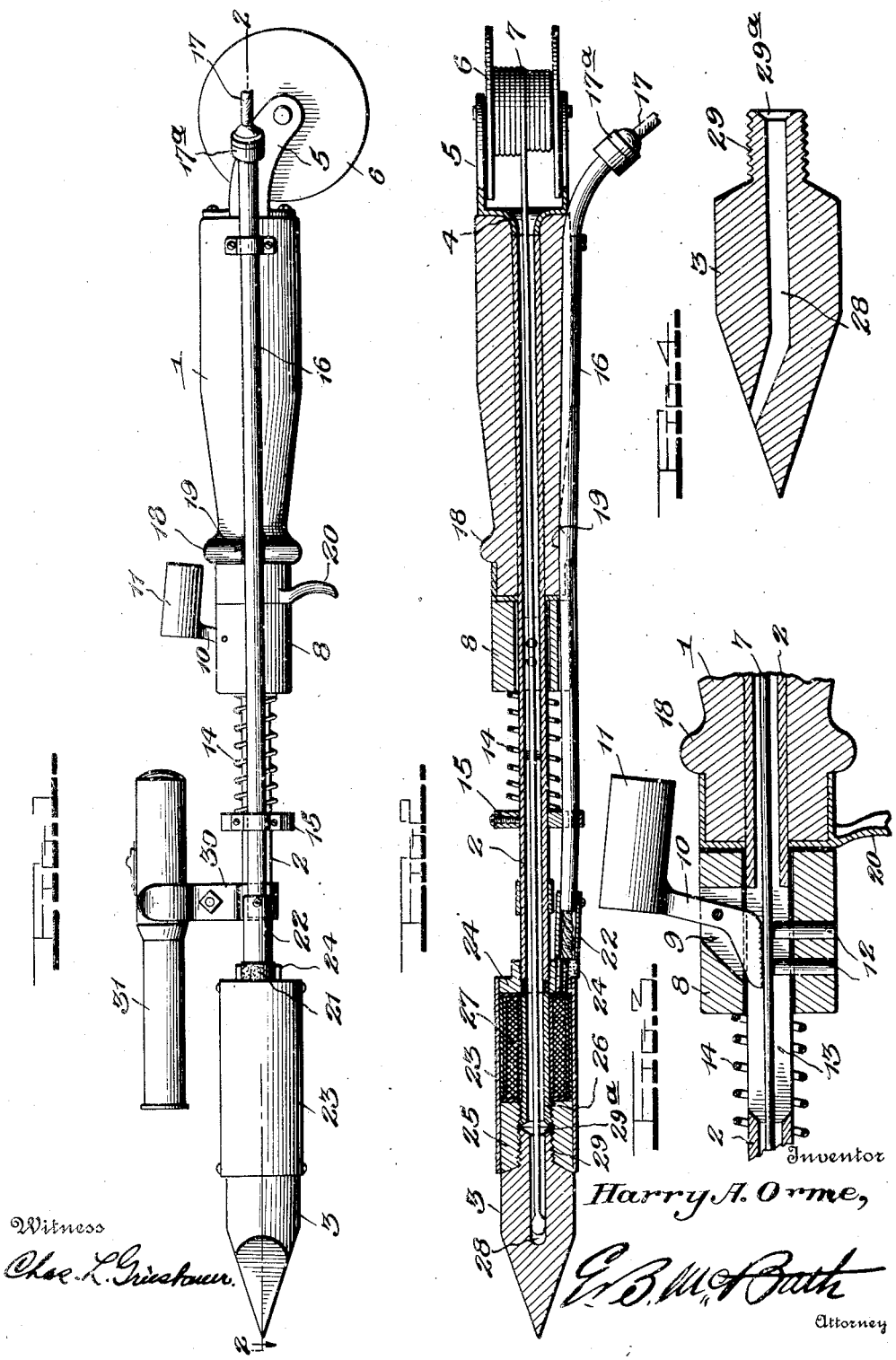
Inventor
Harry A. Orme,
Attorney

UNITED STATES PATENT OFFICE.

HARRY A. ORME, OF WASHINGTON, DISTRICT OF COLUMBIA.

ELECTRIC SOLDERING-IRON.

1,215,693.    Specification of Letters Patent.    Patented Feb. 13, 1917.

Application filed November 20, 1916. Serial No. 132,389.

*To all whom it may concern:*

Be it known that I, HARRY A. ORME, a citizen of the United States, residing at 1884 Columbia road, Washington, District of Columbia, have invented certain new and useful Improvements in Electric Soldering-Irons, of which the following is a specification.

This invention relates to an electrical self-feeding soldering iron, and the object of the invention is to dispense with the usual torch, and also to provide an iron especially adapted for work in places not readily accessible with the usual iron, that is where there would be danger in using a torch or burner for heating the iron in the usual way, or where there is insufficient natural light to properly work in, and no safe means of securing an artificial light from a flame, such as a lamp, candle or by lighting matches.

The invention consists in feeding the solder to the iron through an electric heating unit, in the form of a suitable resistance coil, and in providing in combination with said iron and coil, a flashlight or electric torch so carried by the iron as to direct its rays on the work being performed.

With these objects in view the invention also consists in the novel features of construction hereinafter described, pointed out in the claims, and shown in the accompanying drawings, in which:—

Figure 1 is a side elevation of the complete device.

Fig. 2 is a longitudinal section on the line 2—2 of Fig. 1.

Fig. 3 is a detail section view showing the improved feed mechanism.

Fig. 4 is a sectional view of the iron.

In the drawings 1 designates a suitable handle through which extends a tube 2, projecting from the front of the handle and supporting at its forward end an iron 3.

In the rear end of the handle is inserted a bell 4 which carries slightly curved lugs 5 between which is mounted a reel 6 carrying the solder 7. At the forward end of the handle is a slidable sleeve 8, cut out as at 9, and in the cut out portion is pivoted a solder gripping and feeding shoe 10 the foot portion of which is roughened to engage the solder. The upper outer end of the shoe carries a rearwardly extending counterbalance thumb piece 11 so that when released the shoe will by gravity be lifted by contact from the solder and the sleeve be readily moved rearward, without any rearward movement of the solder.

On the underside of the sleeve, opposite the cut out portion 9 two pins 12 pass through the side of the sleeve and project into a longitudinal slot 13 in the tube 2, forming supports and also undergrips for the solder. The solder passes between these pins and the shoe at time of the initial gripping action of the shoe, and by using two pins the solder is supported from the under side at two points and there is therefore less tendency to bend the solder or kink it than there would be with one point of support only. These pins also prevent turning movement of the sleeve on the tube 2.

A spring 14 is placed about the tube and bears at one end on the sleeve 8 and at its forward end against a collar 15, the spring returning the sleeve to normal position.

A full forward movement of the sleeve feeds the solder about one and a quarter inches, but the amount fed may be any amount less than this and the rate of feed is controlled by the operator.

Running along one side of the tube and handle is a tube 16 which carries the electric wire conductors 17 being provided with a plug 17ª which fits into the rear end of the tube 16 so that the conductor 17 may be readily detached. The opposite end of the conductor, not shown, is of course attached in the usual manner to any suitable and convenient source of current.

The handle is provided with a hand guard flange 18 which is cut at 19 for passage of the tube 16 and the collar 15 is also cut to admit passage of said tube. The tube terminates at the front in a slidable sleeve 22, adapted to be unlocked by loosening a screw and slidable over the tube to expose the ends of the wires for repairs, and between said sleeve 22 and the iron 3 is a metal casing 23, insulated on the inside by asbestos, and which carries brass plugs 24 and 25 at its rear and forward ends. It contains a copper sleeve 26 through which the solder passes and which forms a core for the resistance coils 27 forming the heating unit. This coil is connected with the conductors of the tube 16 and sleeve 22 and is insulated from said sleeve by a collar 24 of meerschaum. This material I have found to be equal to glass as an insulator and superior to it as a resistor of high temperatures, glass being unable to withstand the heat especially when brought into contact with exterior cold or water.

The iron is provided with a passage 28 and the rear end reduced and threaded to engage the plug 25 and the rear end is countersunk as at 29ª thereby forming a small reservoir for the melted solder. A bracket 30 mounted on the tube 2 detachably carries a torch or electric flashlight 31 which directs a light on the article being soldered so that this iron is especially adapted for use in dark corners or places where it is difficult to get a good natural light or dangerous to use exposed flames or lamps.

A fixed trigger 20 is carried by the forward under portion of the handle and forms both a finger support in operating the feed and also, in conjunction with the reel, a support for the iron when laid down, so that the rear end is slightly higher than the iron, thereby preventing rearward flow of the molten solder.

In tests it is found that after the current has been on for four minutes the tube 26 and iron 3 are heated to such an extent as to instantaneously melt the solder, and feeding can then begin, and after seven minutes the conductor 17 can be detached and the solder will flow freely and as rapidly as desired for at least one half hour without re-heating, and in tests the device has been operated, after cutting off current, out of doors in the rain, without injury to the insulation 24, which had it been glass would have broken, and without loss of sufficient heat to interfere with free flow of the solder.

The advantages of such a device will be obvious to all engaged in this particular branch of work and skilled in the use of soldering irons.

What I claim is:—

1. In a device of the kind described, a handle, a solder carrying reel, a solder feed tube passing through said handle, feed mechanism carried by said tube, a resistance coil carried by the tube, an iron having a passage therein and secured to said coil, the passage alining with the coil core, and a conductor carried by the handle and tube and leading to said coil.

2. In a device of the kind described, an iron having a longitudinal passage, a heating unit connected to said iron the core of which alines with the said passage, a solder feeding tube supporting said unit and also alining with the core, the solder passing through said core into said iron, a tube carrying an electrical conductor in circuit with said heating unit, an insulator of meerschaum arrranged adjacent said unit and through which said conductor passes, and a telescoping sleeve carried by the conductor tube and abutting on said insulator.

In testimony whereof I affix my signature.

HARRY A. ORME.